United States Patent [19]

Wohrstein

[11] Patent Number: 5,549,335
[45] Date of Patent: Aug. 27, 1996

[54] SOLDERLESS METALLURGICAL JOINT

[75] Inventor: Franz X. Wohrstein, Park Ridge, Ill.

[73] Assignee: Peerless of America, Incorporated, Chicago, Ill.

[21] Appl. No.: 223,981

[22] Filed: Apr. 6, 1994

[51] Int. Cl.[6] ............................................. F16L 13/02
[52] U.S. Cl. ................................. 285/286; 228/198
[58] Field of Search .............................. 228/131, 198, 228/194, 132; 285/287, 286

[56] References Cited

U.S. PATENT DOCUMENTS

| | | | |
|---|---|---|---|
| 3,040,427 | 6/1962 | Howell | 228/131 |
| 3,180,022 | 4/1965 | Briggs et al. | 228/198 X |
| 3,581,382 | 6/1971 | Wells | 228/198 |
| 3,633,266 | 6/1972 | Taylor | 285/287 X |
| 3,951,328 | 4/1976 | Wallace | 228/207 |
| 3,993,238 | 11/1976 | Brook et al. | 228/198 |
| 4,331,286 | 5/1982 | Miyazaki et al. | 228/198 |
| 5,338,072 | 8/1994 | Bitter et al. | 228/198 X |

*Primary Examiner*—Kenneth J. Ramsey
*Attorney, Agent, or Firm*—Hill, Steadman & Simpson

[57] ABSTRACT

A metallurgical joint between a copper tube and an aluminum tube is disclosed. The metallurgical joint between the tubes is elongated and extends along the length of the telescoping tubes and is substantially free of materials other than copper and aluminum. A method and apparatus for making the metallurgical joint is disclosed.

17 Claims, 2 Drawing Sheets

SOLDERLESS METALLURGICAL JOINT

BACKGROUND OF THE INVENTION

The present invention is directed to an improved solderless metallurgical joint and in particular, to novel methods and apparatus for completing a metallurgical joint between copper and aluminum tubes.

The factors necessary to produce a metallurgical joint or bond between copper and aluminum are well known. For example, it is known in the art that minimal oxides should be present on both of the metals at the area or point where the metals are joined together. It is also known that a mechanical pressure is necessary to provide close proximity at all points where the metals are to be joined. Finally, it is known that heat at the boundary of the copper and aluminum at the proper temperature is necessary to provide a metallurgical bond between the two metals.

At present, there are several methods known for providing a metallurgical bond between copper and aluminum. For example, Japanese Patent 54/133450 discloses the technique of butt welding copper and aluminum tubes or pipes together. This method is based upon the mechanical pressure and frictional heat build up between the tube ends to form a butt weld joint. Additionally, U.S Pat. No. 3,633,266 discloses a process which requires a solder coating on the joint defining surface between the copper and aluminum tubes. The heating and the telescopic pressure movement of the tubes relative to one another breaks up the oxide coating on the solder coating and facilitates a body between the outside and inside surfaces of the copper and aluminum tubes. The resultant joint includes a solid coating of a solder positioned on the joint defining surfaces between the two metals. Also, it has been suggested that copper and aluminum sheets may by rolled and pressed together to produce a bonded sheet material. From this sheet material, copper and aluminum bonded tubes are drawn. This process is an expensive and time consuming operation.

The above described techniques and methods for providing a metallic joint between copper and aluminum tubes have failed to provide uniform and linear metallurgical joints or bonds between the copper and aluminum. For example, in the butt weld process, the thickness of the joint is limited to the width of the wall thickness of copper and aluminum tubes. Accordingly, it is often times necessary that the wall width or thickness be increased by using various swaging techniques to provide sufficient weld area. However, the weld area available when using the butt weld process is generally less than 0.075 inches in width. To produce heavier or thicker tube walls prior to butt welding, additional manufacturing steps are required, which steps require additional apparatus, are time consuming and very expensive.

Additionally, many of the steps necessary for depositing a solder coating between the aluminum and copper tubes, are eliminated, such as the preparation by swaging of the aluminum tube and the sonic timing using zinc or the aluminum and or copper tubes or the copper tube alone are time consuming and expensive operations. The prior art processes for completing the solder coating metallurgical joint requires the joining of copper and aluminum which require dipping of the joint or tube ends vertically into the molten zinc, a process which limits orientation options during manufacturing. Finally, the production of flashing in the tubes from butt welded joints and the use of solder coatings or zinc, in the sonic tinning process, often times leaves debris inside the tubes which cause rapid failure of the compressor during heat exchanger operations.

SUMMARY OF THE INVENTION

One object of the present invention is to provide solderless metallurgical joint between copper and aluminum tubes or pipes.

It is a further object of the present invention to provide a uniform and linear metallurgical joint between copper and aluminum tubes or pipes.

It is another object of the present invention to provide a metallurgical joint between dissimilar tubes and pipes.

It is an additional object of the present invention to provide a novel method of providing a metallurgical joint between copper and aluminum tubes.

It is still another object of the present invention to provide a novel method of making a solderless metallurgical joint between copper and aluminum tubes.

Another object of the present invention is to provide a novel apparatus for providing a metallurgical joint between copper and aluminum tubes or pipes.

It is a further object of the present invention to provide a fluxless metallurgical joint between copper an aluminum tubes.

And it is yet another object of the present invention to provide a linear metallurgical joint between copper and aluminum containing a eutectic mixture of copper and aluminum between the copper and aluminum tubes.

The present invention relates to a metallurgical joint and to a method for making such a metallurgical joint between copper and aluminum tubes. The process for making the linear metallurgical joint between the copper and aluminum tubes includes utilizing a copper tube or pipe having an outside diameter between about 0.100 and 1.00 inches in diameter. The copper tube is preformed on one end by swaging to taper the copper tube to between about ½ degree to 30 degrees for a length of between about 0.25 inches and 1.00 inches. The aluminum tube or pipe to which the copper tube will be joined generally has an inside diameter greater than the finished outside diameter of the swaged tip portion of the copper tube. The aluminum tube is cut to length to leave a square end on the tube for joining with the copper tube. The aluminum metal possess a lower tensile strength than copper metal and, therefore, the aluminum tubing deforms more readily than the copper tubing.

In the preferred embodiment of the present invention, it is contemplated that the swaged end copper tube will be inserted into the aluminum tube to expand the aluminum tube at the joint to complete and provide the linear metallurgical bond between the copper and aluminum tubing. The aluminum tube is maintained free of oils and dirt and is positioned in a clamping means or block and moved into close proximately to the tapered surface of the copper tube. The tapered surface has been swaged and cleaned of oxides by one or several means, such as by chemicals, by mechanical or by sonics to provide a clean dry oxygen-free surface immediately prior to the joining of the copper tube with the aluminum tube. The copper tube is cut to length and held on a mounting bracket inserted through an induction heating coil and backed up with a stop.

The placement of the induction heating coil about the tapered copper end and the immediate aluminum end is such that most of the heating coil will be surrounding the copper tube portion as it engages the end of the aluminum tube. The induction heating coil is excited so that heat is supplied to the tubes as rapidly as possible to a temperature in excess of about 900° F. When the elevated temperature is reached, the aluminum tube and its clamped holder is pushed or telescoped onto the copper tube by means of a piston member at a constant force. When the aluminum tube is positioned and telescoped about the swaged end portion of the copper tubing, the induction heating coil is shut off. A short cooling period is provided and the joined tubes are released and removed from the assembly.

Chemical analysis utilizing dispersive x-ray spectroscopy has been performed on the completed joint or bond between the copper and, aluminum tubes. The analysis and examination has revealed, it is believed, an intermetallic layer between the tubes which provides an intermetallic bond between the copper and aluminum tubes. The intermetallic layer or bond is believed to be an eutectic mixture of copper and aluminum containing approximately 60 per cent to 70 per cent aluminum and approximately 40 per cent to 30 per cent metal copper, with the eutectic mixture having a formation eutectic temperature of approximately 1018° F.

The thickness of the intermetallic eutectic mixture layer between the copper and aluminum tubes is between about 0.0002 to 0.0010 inches depending upon the distance between the openings of the joint between the aluminum and copper tubes. The intermetallic eutectic mixture layer extends substantially throughout the telescoping linear length of the joint between the copper and aluminum tubes to provide a joint having an axial linear direction with respect to the tube length. The resultant bond provides a stronger bond possessing higher tensile strength than butt weld and solder containing copper/aluminum metallurgical joints.

The present invention provides a method of maximizing the propinquity or nearness of the joint between the copper and aluminum tubes to provide an intermetallic bond which is an eutectic mixture of aluminum and copper.

Additionally, minimal oxides at the boundary of the metals are produced by the method of the present invention. Generally, oxide layers result by reason of the rapid and fast electrical heating of the cleaned copper tubes or pipes. Also, during the telescoping movement of the aluminum tube onto the copper tube, any formed aluminum oxide is mechanically scraped and removed from the interior or exterior surface of the aluminum tube thereby, it is believed, exposing an oxide-free layer of aluminum to engage and contact the oxide-free layer of copper.

Other and further significant objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the present invention providing same or identical or equivalent principles may be used and structural changes which may be made as desired by those skilled in the art without departing from the scope of the present invention.

DESCRIPTION OF THE DRAWINGS

For facilitating and understanding the present invention, there is illustrated in the accompanying drawings a preferred embodiment thereof, from an inspection of which, when considered in connection with the following description, the invention, its construction and operation and many of it advantages will be readily understood and appreciated.

DETAILED DESCRIPTION

Figure 6:
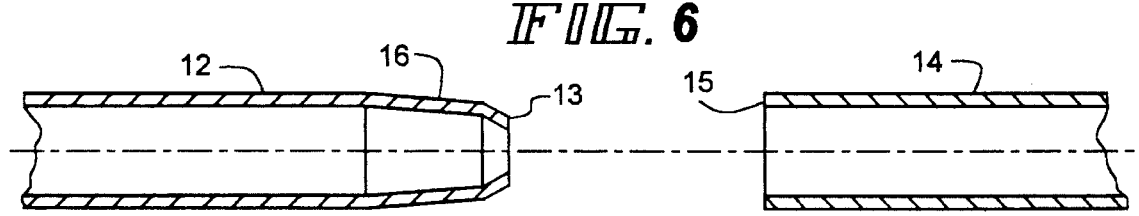
FIG. 6 is an enlarged cross-sectional view illustrating the axial alignment of the swaged end copper tube prior to engagement with end of the aluminum tube in accordance with the present invention.
Figure 7:
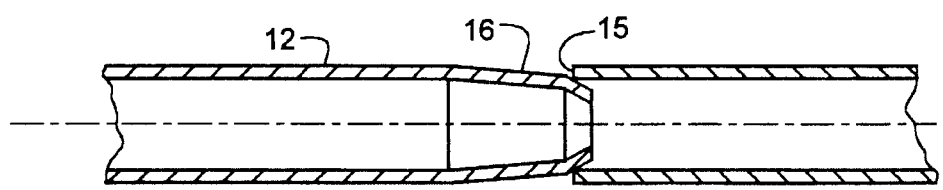
FIG. 7 is an enlarged cross-sectional view illustrating the engagement of the cut end of the aluminum tube onto the swaged copper tube prior to heating and joining of the metallurgical joint in accordance with the present invention.

Referring now to the drawings wherein like numerals have been used throughout the several views to designate the same or similar parts, in FIGS. 1–8, an apparatus and method is schematically illustrated for completing a metallurgical joint between copper and aluminum tubes in accordance with one embodiment of the present invention. The method for making the linear metallurgical joint 10 (FIG. 8) between a copper tube or pipe 12 and an aluminum tube or pipe 14, will hereinafter be described. The copper the tube or pipe 12, preferably, has an outside surface diameter between about 0.100 and 1.00 inches, with the copper tube end 13 (FIG. 6) having a swaged portion 16 which is tapered with respect to the longitudinal axis of the copper tube to between about one-half to thirty degrees from the end 13 of the copper tube. The swaged portion extends between about 0.25 to 1.00 inches from the end 13 of the copper tube or pipe, as shown in FIG. 6. The copper stub or tube 12 that has been swaged, degreased and deoxidized, is mounted within an induction heater coil 18 that surrounds the tube and movable axially relative to the copper tube 12. The copper stub or tube is mounted onto a pin 17 that is inserted through the induction heater coil 18 and backed to engage a stop (not shown).

Figure 1:
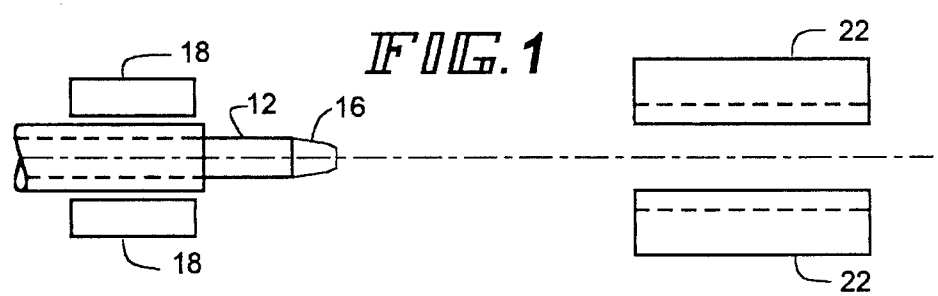
FIG. 1 is a schematic view illustrating the apparatus for completing the metallurgical bond between copper and aluminum tubes with the copper tube positioned within the heater member in accordance with the present invention.
Figure 2:
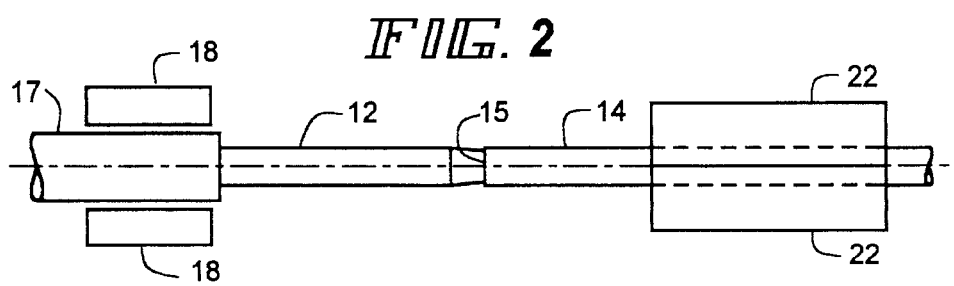
FIG. 2 is a schematic view illustrating the positioning of the copper within the induction heater coil and the aluminum tube positioned and clamped within the gripping members, with the aluminum tube end axially positioned to engage the swaged end of the copper tube in accordance with the present invention.

The aluminum tube or pipe 14 is cut to length to leave a generally perpendicular or square end 15. The aluminum tube 14 is maintained free of oils as clean as possible and positioned within a tube gripping member or clapping means 22, which firmly engages and holds the aluminum tube in axial alignment with the swaged end portion of the copper tube. As shown in FIG. 2, the aluminum tube end 15 is then axially moved by the clamping means 22 into close proximity to engage the tapered swaged portion 16 of the copper tube.

Figure 3:
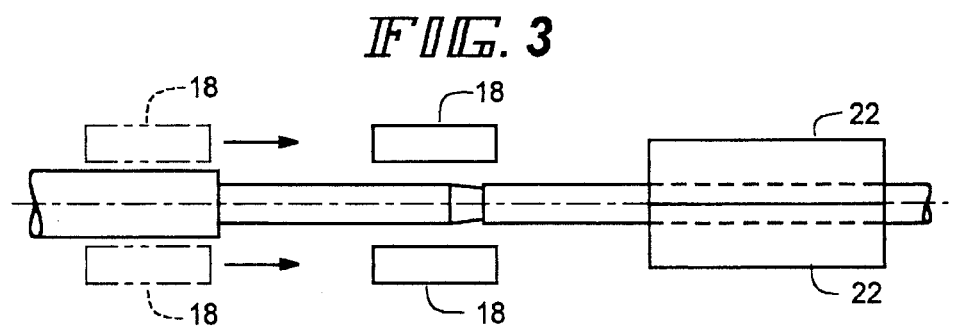
FIG. 3 is a schematic view of the positioning of the induction heater coil about the swaged end of the copper tubing and the end of the aluminum tubing and energized in accordance with the present invention.

The induction heater coil 18 is then axially moved and positioned about the swaged end portion 16 of the copper tube with most of the induction heating coil 18 surrounding the copper tube to heat the same. The correct placement of the major portion of the heater coil about the copper tapered end portion of the copper pipe instead of about the aluminum tube end is important, because most of the heating must be of the copper tube. Allowance must be made for the relative masses of the copper and aluminum tubes. For example, a thin walled copper tube will require less heating to reach the desired temperature and, therefore, should began the cycle inserted further into the heating coils than is otherwise be the case, the embodiment of the present invention, as shown in FIG. 3. Various other combinations of the aluminum tube and the copper tube weights and wall thickness are relative to the placement of the tube in the heating coil considerations.

Figure 4:
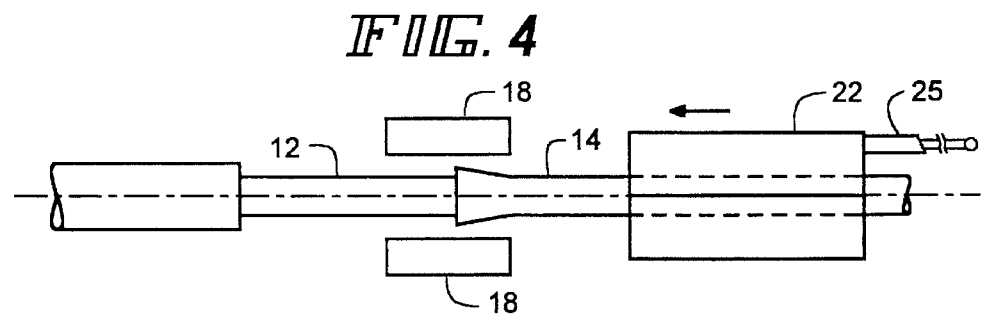
FIG. 4 is a schematic view illustrating the induction heater coil turned off and the axial advancement and movement of the aluminum tube by the gripping members being moved in an axial direction towards the copper tubing to push the aluminum tube onto the swaged surface of the copper tube at a constant force in accordance with the present invention.
Figure 5:
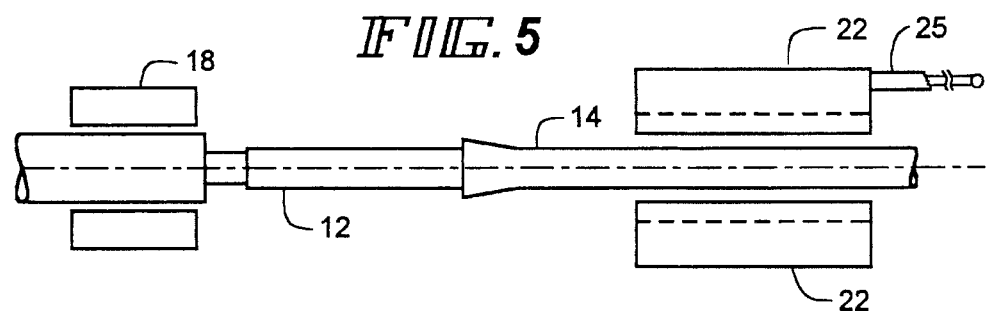
FIG. 5 is a schematic view illustrating the release by the gripping member of the aluminum tubing and the return of the induction heating coil to its initial at rest position to permit the removal of the completed metallurgical joint between the copper and aluminum tubing in accordance with the present invention.

After the induction heating coil has heated the two tubes as fast as possible to a temperature in excess of 900° F., the aluminum tube is then pushed or telescoped onto the copper tube by means of a piston member 25 engaging the gripping members 22 arrangement at a constant force, as shown by the direction of the arrow in FIG. 4. After the aluminum tube has been pushed onto the copper tube and the induction heater is turned off, a short cooling period of a few seconds is allowed for the plastic or liquid metallurgical joint to solidify to complete the metallurgical joint. At this point, the gripping members 22 are released and the joined copper and aluminum tube is removed from the assembly, as shown in FIG. 6.

Figure 8:
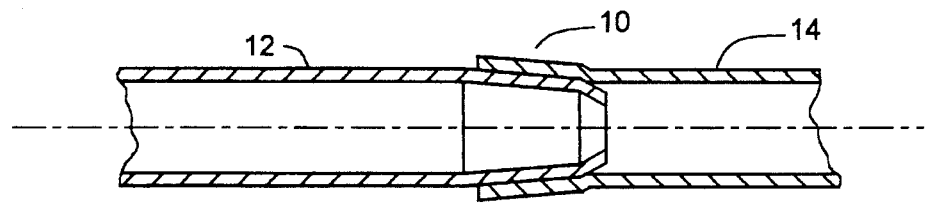
FIG. 8 is an enlarged cross-sectional view illustrating the metallurgical joint providing in accordance with one embodiment of the present invention between a copper tube and an aluminum tube.

FIG. 8 is an enlarged view illustrating the surrounding engagement of the aluminum tube end 15 about the swaged portion 16 of the copper tube 12 to complete the linear metallurgical joint between the copper and aluminum tubes. As is readily understood in the preferred embodiment of the present invention, it is contemplated that a copper tube will be inserted into the aluminum tube to continuously expand the aluminum tube during the telescoping movement of the aluminum tube onto the copper tube to provide the preferred metallurgical bond between the copper and aluminum tubing. The round circular shape of the tubes to be joined allows for an even swage of the stiffer metal, the copper tubing into the more malleable metal, the aluminum tube. The special tapered design of the copper tube end causes the aluminum tube to be continuously enlarged in diameter as the copper is pushed into the aluminum tube.

However, it is within the scope of the present invention that the reverse procedure, that is, the aluminum tube could be inserted into a swaged copper tube that has been enlarged. In such situation, the tapered enlarged end of the copper tube causes the aluminum tube to be continuously diminished in diameter as the aluminum tube is pushed into the copper tube. It is also possible to use the disclosed apparatus but by modification of relative sizes and shapes of the ends of the copper and aluminum tubes to control the heating of the tube ends to achieve the novel joint in accordance with the present invention.

Analysis performed on completed metallurgical bonds between the copper and aluminum tubes using dispersive x-ray spectroscopy has determined that an intermetallic layer between the tubes provides the intermetallic bond between the copper and aluminum tubes. The intermetallic layer bond has been observed to be a eutectic mixture of copper and aluminum containing approximately between about 60 per cent to 70 per cent aluminum and between approximately 40 per cent to 30 per cent copper. The preferred eutectic mixture of copper and aluminum is approximately 67 per cent aluminum and approximately 33 per cent copper. The metallurgical bond resulting from such a eutectic mixture has a eutectic formation temperature of approximately 1018° F.

It has further been observed that the thickness of the intermetallic eutectic mixture layer between the copper and aluminum tubes measures between about 0.0002 to 0.0010 inches depending upon the distance between the openings of the joint between the aluminum and copper tubes. Moreover, analysis has indicated that the intermetallic eutectic mixture layer extends throughout the linear length of the joint between the copper and aluminum tubes to provide an axial linear metallurgical joint between the tube members.

Although the present invention and process has been described in terms of metallurgically joining together copper an aluminum tubes, which are most prevalent in the heat exchanger industry, it is within the scope of the present invention to join aluminum to aluminum or to join dissimiliar metals, such as aluminum to steel.

The present invention provides a method of maximizing the propinquity or nearness of the joint between the copper and aluminum tubes to provide an intermetallic bond which is an eutectic mixture of aluminum and copper. Such a joint provides a stronger bond possessing higher tensile strength than the butt weld and the solder coating between the copper and aluminum tubes, as is true of the known processes for joining the tubes together.

The apparatus and method in accordance with the present invention in manufacturing these metallurgical joints between copper and aluminum tubes allows for the joining of copper and aluminum tubes of any length and any in orientation, vertically or horizontally. Moreover, the metallurgical joint described in the present invention utilizes no zinc and thus eliminates the problem of debris getting into the tubes which may cause possible failure later on of the compressor in the heat exchanger operation as well as eliminating the problem of flashing and redrilling which results when using the prior art processes.

We claim:

1. A method of providing a metallurgical joint between first and second tubular members comprising the steps of:

mounting the first and second tubular members having open ends thereof, in axial aligned position with respect to one another;

positioning the ends of the first and second tubular members in abutting relationship;

heating the end of at least one of said first and second tubular members to at least the eutectic temperature of the materials comprising the metallurgical joint;

telescoping movement of one of either of said first and second tubular members with respect to the other member to provide a forced fit between the outside surface of one of said members and the inside surface of the other of said members to provide a linearly extending joint between the tubular members, said forced fit serving to expand the outermost tube; and cooling the ends of the joined tubular members to provide the linear metallurgical joint between the tubular members with the interior of said joined tubular members being free of debris from the formed joint.

2. The method in accordance with claim 1 wherein one of said first or second tubular members is comprised of copper and the other of said first or second tubular members is comprised of aluminum.

3. The method in accordance with claim 2, further including the step of swaging the end of the copper tubular member to provide a tapered outer surface adjacent the end thereof prior to the step of mounting of said copper tubular member in axial aligned position with respect to the aluminum tubular member.

4. The method in accordance with claim 3, further including the step of deoxidizing the tapered outer surface of the copper tubular member prior to the step of mounting said copper tubular member.

5. The method in accordance with claim 1, wherein said telescoping movement of said tubular members with respect to each other is at a constant and predetermined force.

6. The method in accordance with claim 1, wherein said eutectic temperature of the metallurgical joint is about 1018° F.

7. The method in accordance with claim 1, wherein the first and second metal tubular members are dissimilar metals.

8. The method in accordance with claim 7, wherein the dissimilar metals are aluminum and steel.

9. A metallurgical eutectic joint between a copper tube and an aluminum tube with the aluminum tube being greater in diameter than the copper tube, each having open ends therein, wherein said metallurgical eutectic joint extends in a longitudinal direction of between about 0.25 to 1.00 inches and is comprised of between about 60–70 per cent aluminum and 40–30 per cent copper.

10. The metallurgical joint in accordance with claim 9, wherein said copper tube has a portion swaged adjacent the end thereof.

11. The metallurgical joint in accordance with claim 9, wherein said thickness of said metallurgical joint is between about 0.0002 to 0.001 inches.

12. The metallurgical joint in accordance with claim 9, wherein said aluminum content is about 67 per cent and said copper content is about 33 per cent.

13. The metallurgical joint in accordance with claim 10, wherein said swaged portion is at an angle of between one half to thirty degrees with respect to the axial centerline of said copper tube.

14. A method of providing a metallurgical eutectic joint between first and second tubular member with one of the tubular members being comprised of cooper and the other tubular members being comprised of aluminum, comprising the steps of:

swaging the end of the copper tubular member to provide a tapered outer surface adjacent the end thereof;

mounting the first and second tubular members, in axial aligned position with respect to one another;

positioning the ends of the first and second tubular members in abutting relationship;

heating the ends of said first and second tubular members to at least the eutectic temperature of the materials comprising the metallurgical joint;

telescoping movement of one of either of said first and second tubular members with respect to the other member to provide a forced fit between the outside surface of one of said members and the tapered inside surface of the other of said members to provide a linearly extending joint between the tubular members; and cooling the ends of the joined tubular members to provide the linear metallurgical joint between the tubular members.

15. The method in accordance with claim 14, further including the step of deoxidizing the tapered outer surface of the copper tubular member prior to the step of mounting said copper tubular member.

16. The method in accordance with claim 14, wherein said telescoping movement of said tubular members with respect to each other is at a constant and predetermined force.

17. The method in accordance with claim 14, wherein said eutectic temperature of the metallurgical joint is about 1018° F.

* * * * *